M. B. FLAHERTY.
DIRIGIBLE HEADLIGHT MECHANISM FOR AUTOMOBILES.
APPLICATION FILED OCT. 26, 1915.
1,183,364.
Patented May 16, 1916.
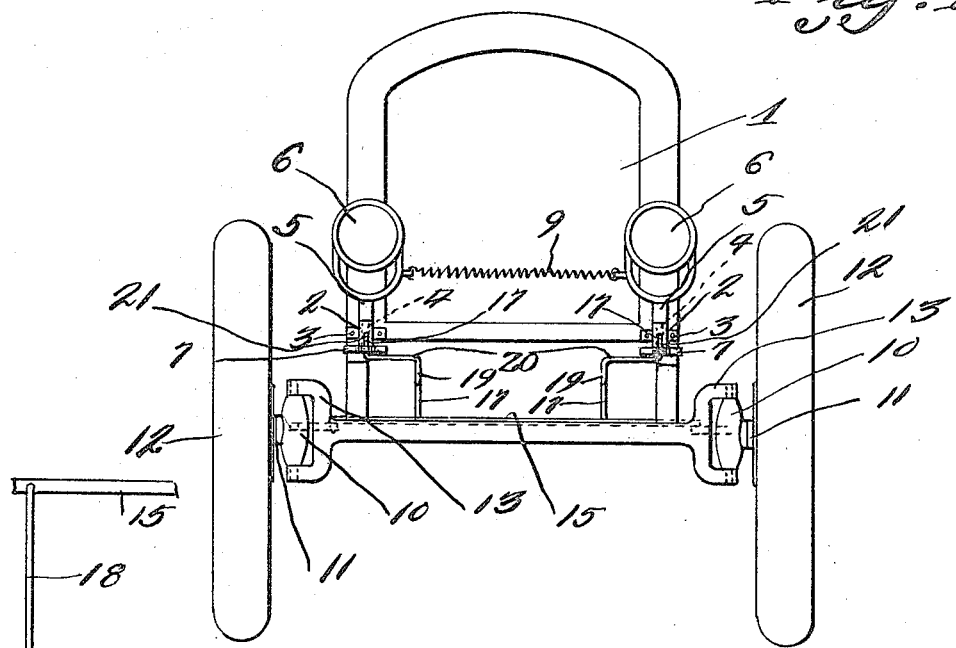
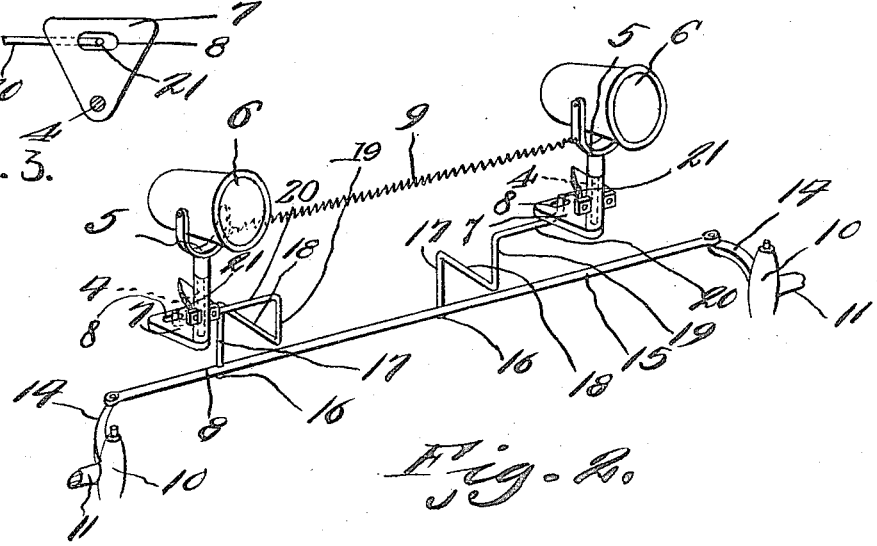

UNITED STATES PATENT OFFICE.

MIKE B. FLAHERTY, OF SPRINGFIELD, TENNESSEE, ASSIGNOR TO WILLIAM F. WALTON, CALLIE P. WALTON, AND ROBERT H. PORTER, ALL OF SPRINGFIELD, TENNESSEE.

DIRIGIBLE HEADLIGHT MECHANISM FOR AUTOMOBILES.

1,183,364. Specification of Letters Patent. Patented May 16, 1916.

Application filed October 26, 1915. Serial No. 57,971.

*To all whom it may concern:*

Be it known that I, MIKE B. FLAHERTY, a citizen of the United States, residing at Springfield, in the county of Robertson, State of Tennessee, have invented a new and useful Dirigible Headlight Mechanism for Automobiles; and I do hereby declare the following to be a full, clear, and exact description of the invention, such as will enable others skilled in the art to which it appertains to make and use the same.

This invention relates to an improved dirigible headlight mechanism for automobiles, and an object of the invention is to provide a device of this nature which is simple, efficient and practical in construction, and which comprises improved detail features, of such construction that as the front wheels are turned in one direction or the other to considerable degree, the head lamp or light will be correspondingly turned, but when the machine or automobile is traveling substantially straight, the headlight will remain substantially straight ahead, excepting a slight vibratory movement.

In practical fields the details of construction may necessitate alterations, falling within the scope of what is claimed.

The invention comprises further features and combination of parts, as hereinafter set forth, shown in the drawings and claimed.

In the drawings: Figure 1 is a view in elevation of the front portion of an automobile, showing the improved dirigible headlight mechanism as applied. Fig. 2 is an enlarged perspective view of the dirigible headlight mechanism detached from the automobile. Fig. 3 is a plan view of one of the segmental plates of one of the headlights, showing the connection between the segmental plate and the transverse connecting rod of the knuckles of the front wheels, and illustrating the slots in the segmental plate.

Referring more especially to the drawing 1 designates the front portion of an automobile, to both sides of the radiator of which brackets 2 are connected as at 3, and journaled in said brackets are the lower stems 4 of the brackets 5 of the headlights or lamps 6. Connected to and movable with the lower ends of the stems 4 are segmental plates 7, which are provided with elongated slots 8, which extend transversely of said segmental plates. Connecting the adjacent arm of both brackets 5 of the headlights 6 is a coil spring 9, which, under ordinary steering of the front wheel, for instance, substantially straight, holds the lamps substantially straight ahead, excepting for a slight vibratory movement.

The automobile is provided with the usual front axle having the knuckles 10, which are carried by the stub axle 11, on which the front wheels 12 are mounted. The knuckles 10 are designed to rock in the forks 13 of the front axle, and are provided with rearwardly extending arms 14, which are connected by the usual connecting rod 15, which is designed to be in turn connected to the usual steering column (not shown), for shifting the rod 15 in one direction or the other transversely of the machine. When the rod 15 is shifted transversely, the front wheels are guided in one direction or the other. Rigidly fixed at 16 to the rod 15 are the rods or brackets 17, which extend upwardly from the rod 15, then forwardly as at 18, upwardly as at 19, and subsequently laterally in opposite directions as shown at 20. The parts 20 of the rods or brackets 17 terminate in upwardly extending arms 21, which extend through the slots 8 of the segmental plates 7. It is to be observed that the slots 8 will permit slight transverse movements of the rod 15 in opposite directions, without materially affecting the lights or lamps. In other words, under ordinary substantially straight driving of the machine, the headlights will remain substantially straight ahead, owing to the arms 21 having slight lateral play in the slots 8. However, when decidedly turning the front wheels, it is to be understood that the rod 15 shifts transversely in one direction or the other, and in this case the arms 21 will contact with the opposite ends of the slots 8, so that the headlights will be turned substantially correspondingly with the turning of the front wheels, or rather substantially with the direction of travel of the front wheels, and when the front wheels are nearing their straight ahead positions, the coil spring 9 will act to instantly draw the lamps yieldably to their straight ahead position, and as the lamps or headlights reach said straight ahead position they will slightly vibrate for a while, and then will be held substantially straight ahead. The slots 8 are a trifle wider than the thicknesses of said arms 21, to permit slight forward play of the arms incident to the connecting rod moving transversely.

The invention having been set forth, what is claimed as new and useful is:—

1. In combination, a pair of headlight brackets including headlights and having downwardly extending stems, bearings on the frame of the automobile in which said stems are mounted to rock, a spring connecting the adjacent sides of both headlight brackets, the lower ends of the stems having segmental plates fixed thereto, and angular arms carried by the connecting rods connecting the knuckles of the front wheels of the automobile and having loose connections with said segmental plates, whereby as the front wheels of the automobile are turned in one direction or the other, the headlights will be correspondingly turned substantially.

2. In combination, a pair of headlight brackets including headlights and having downwardly extending stems, bearings on the frame of the automobile in which said stems are mounted to rock, a spring connecting the adjacent sides of both headlight brackets, the lower ends of the stems having segmental plates fixed thereto and extending rearwardly, a transverse connecting rod connecting the knuckles of the front wheels of the automobile, rods fixed to said connecting rod and extending upwardly, forwardly and laterally in opposite directions and subsequently terminating in upwardly extending arms, said segmental plates having transverse elongated slots, to receive said upwardly extending arms, whereby as the front wheels are turned in one direction or the other decidedly, the headlights will be correspondingly turned, said slots in the segmental plates being a little wider than the thicknesses of said arms, to permit slight forward play of the arms incident to the connecting rod moving transversely.

In testimony whereof I have signed my name to this specification in the presence of two subscribing witnesses.

MIKE B. FLAHERTY.

Witnesses:
W. W. McClanahan,
F. M. Smith.

Copies of this patent may be obtained for five cents each, by addressing the "Commissioner of Patents, Washington, D. C."